US012042907B2

(12) United States Patent
Escudero Hernández

(10) Patent No.: US 12,042,907 B2
(45) Date of Patent: Jul. 23, 2024

(54) FASTENING TOOL

(71) Applicant: NISSAN NORTH AMERICA, INC., Franklin, TN (US)

(72) Inventor: Diego Eder Escudero Hernández, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 497 days.

(21) Appl. No.: 17/358,986

(22) Filed: Jun. 25, 2021

(65) Prior Publication Data

US 2022/0410351 A1 Dec. 29, 2022

(51) Int. Cl.
*B25B 21/00* (2006.01)
*B25B 23/12* (2006.01)

(52) U.S. Cl.
CPC ............ *B25B 21/002* (2013.01); *B25B 23/12* (2013.01)

(58) Field of Classification Search
CPC ... B25B 21/002; B25B 27/16; B25B 23/0085; B25B 23/12; B25B 13/06; B25B 13/065; B25B 13/462
See application file for complete search history.

(56) References Cited

U.S. PATENT DOCUMENTS 289,396 A * 12/1883 Davis .................... B25B 21/002 81/56
623,793 A * 4/1899 Larson .................. B25B 21/002 81/56
871,482 A * 11/1907 Coulter ................. B25B 21/002 81/56
1,396,591 A * 11/1921 Reist ................... B25B 23/0085 81/58.3
1,412,552 A * 4/1922 Carlson ................... B25B 23/10 81/55
1,426,682 A * 8/1922 Snell ................... B25B 23/0085 81/55
1,477,355 A * 12/1923 Jacobs .................... B25B 23/10 81/55
1,483,019 A * 2/1924 Smith ................. B25B 23/0085 81/55
1,607,929 A * 11/1926 Waters ................ B25B 23/0085 29/268
1,609,086 A * 11/1926 Hurschman ........... B25B 13/462 81/59.1
1,897,465 A * 2/1933 Coon ...................... B25B 13/48 29/238
2,243,948 A * 6/1941 Eyrick .................... B25B 17/00 81/56
3,306,140 A * 2/1967 Smiley .................... B25B 17/00 81/60
3,369,421 A * 2/1968 Stanford ............... B25B 21/002 74/606 R
3,587,683 A 6/1971 Bangerter
3,620,105 A * 11/1971 Batten ................... B25B 21/002 81/57.14

(Continued)

*Primary Examiner* — David B. Thomas
(74) *Attorney, Agent, or Firm* — Global IP Counselors, LLP

(57) ABSTRACT

A fastening tool includes a gear train and a socket. The gear train rotates as the fastening tool moves between a non-operated position and an operated position. The socket receives a fastener at a first end of the fastener. The socket is rotatably supported to the gear assembly so that the socket rotates as the gear assembly rotates.

16 Claims, 10 Drawing Sheets

(56) References Cited

U.S. PATENT DOCUMENTS

| | | | | | |
|---|---|---|---|---|---|
| 3,979,977 | A * | 9/1976 | Dorma | E05D 13/1261 | 81/57.13 |
| 3,987,691 | A * | 10/1976 | Savage | B25B 13/481 | 81/57.3 |
| 4,106,371 | A * | 8/1978 | Akiyoshi | B25B 21/002 | 81/124.1 |
| 4,287,795 | A * | 9/1981 | Curtiss | B25B 21/002 | 81/57.3 |
| 4,524,650 | A * | 6/1985 | Marks | B25B 13/46 | 81/57.39 |
| 4,604,919 | A * | 8/1986 | Rollo | B25B 13/463 | 81/61 |
| 4,974,478 | A * | 12/1990 | Wolff | B25B 7/22 | 81/58.3 |
| 4,998,452 | A | 3/1991 | Blum | | |
| 5,284,071 | A * | 2/1994 | Brettes | F01D 25/285 | 81/57.14 |
| 5,363,726 | A * | 11/1994 | Smith | B25B 17/00 | 81/57.29 |
| 5,460,062 | A * | 10/1995 | Wilson, Jr. | B25B 13/48 | 81/57.3 |
| 5,584,220 | A * | 12/1996 | Darrah | B25B 13/467 | 81/57.39 |
| 5,609,077 | A * | 3/1997 | Ohmi | B25B 21/002 | 81/57.13 |
| 6,112,621 | A * | 9/2000 | Ochiai | B25B 13/463 | 81/57.13 |
| 6,267,026 | B1 * | 7/2001 | Yamamoto | B25B 21/00 | 29/798 |
| 6,295,899 | B1 * | 10/2001 | Lee | B25B 13/462 | 81/179 |
| 6,327,937 | B1 * | 12/2001 | Ibarra | B25B 23/0085 | 81/55 |
| 6,370,987 | B1 * | 4/2002 | Wilson, Jr. | B25B 21/004 | 81/57.39 |
| 6,536,310 | B2 * | 3/2003 | Goldfein | B25B 17/00 | 81/185 |
| 6,559,613 | B1 * | 5/2003 | Elliott | B25B 21/002 | 318/434 |
| 6,698,314 | B1 * | 3/2004 | Nichols | B25B 23/0085 | 81/58 |
| 6,722,232 | B1 * | 4/2004 | Day | B25B 17/00 | 81/57.39 |
| 7,137,318 | B2 * | 11/2006 | Falzone | B25B 23/0078 | 81/57.39 |
| 7,204,174 | B1 * | 4/2007 | Wood | B25B 13/481 | 81/125 |
| 8,313,403 | B2 * | 11/2012 | Wilson, Jr. | F16H 37/041 | 475/343 |
| 8,322,255 | B1 * | 12/2012 | Jordan | B25B 23/0085 | 81/57.32 |
| 8,353,229 | B1 * | 1/2013 | Muhareb | B25B 13/463 | 81/55 |
| 8,438,955 | B2 * | 5/2013 | Wilson, Jr. | B25B 21/002 | 81/57.36 |
| 9,242,354 | B2 * | 1/2016 | Walsh | B25B 23/0085 | |
| 9,902,049 | B2 * | 2/2018 | Douglass | B25B 13/481 | |
| 9,981,366 | B2 * | 5/2018 | Todd | B25B 23/12 | |
| 10,150,207 | B2 * | 12/2018 | Roberts | B25B 13/488 | |
| 10,322,479 | B2 * | 6/2019 | Kira | B25B 23/12 | |
| 10,328,554 | B2 * | 6/2019 | Todd | B25B 23/12 | |
| 10,399,214 | B2 * | 9/2019 | Winnard | B25B 13/463 | |
| 10,974,369 | B2 * | 4/2021 | Tan | B25B 23/16 | |
| 11,130,215 | B2 * | 9/2021 | Gupte | B25B 17/00 | |
| 11,280,365 | B2 * | 3/2022 | Johnson | F16B 31/021 | |
| 11,285,585 | B2 * | 3/2022 | Winnard | B25B 13/463 | |
| 11,446,793 | B2 * | 9/2022 | Tan | B25B 13/462 | |
| 11,504,829 | B2 * | 11/2022 | Pannone | B25B 21/00 | |
| 11,724,366 | B2 * | 8/2023 | Hoppe | B25B 13/04 | 81/57 |
| 11,759,936 | B2 * | 9/2023 | Magda | F16H 1/20 | 81/57.29 |
| 11,766,769 | B2 * | 9/2023 | Krupey | B25B 13/065 | 81/13 |
| 2004/0099103 | A1 * | 5/2004 | Vaughan | B25B 13/065 | 81/124.4 |
| 2005/0076746 | A1 * | 4/2005 | Hsien | B25B 13/462 | 81/59.1 |
| 2010/0269638 | A1 * | 10/2010 | Wilson, Jr. | B25B 21/002 | 81/57.36 |
| 2012/0103142 | A1 * | 5/2012 | Sroka | B25B 17/02 | 81/57.3 |
| 2013/0091992 | A1 * | 4/2013 | Walsh | B25B 23/0085 | 81/55 |
| 2015/0202749 | A1 * | 7/2015 | Sanders | B25B 17/02 | 81/57.24 |
| 2017/0232591 | A1 * | 8/2017 | Davis, Jr. | B25B 23/12 | 81/125 |
| 2018/0079055 | A1 * | 3/2018 | Wang | B25B 13/462 | |
| 2018/0085900 | A1 * | 3/2018 | Seith | B25B 13/481 | |
| 2019/0001473 | A1 * | 1/2019 | Harper | B25B 27/16 | |
| 2019/0061115 | A1 * | 2/2019 | Jokinen | B25B 13/466 | |
| 2020/0408288 | A1 * | 12/2020 | O'Reilly | B25B 13/04 | |
| 2021/0316427 | A1 * | 10/2021 | Langhorst | B25B 13/481 | |
| 2021/0362307 | A1 * | 11/2021 | Anderson | B25F 3/00 | |

* cited by examiner

FASTENING TOOL

BACKGROUND

Technical Field

The present disclosure generally relates to a fastening tool. More specifically, the present disclosure relates to a fastening tool for installing threaded fasteners to mechanical components.

Background Information

Fastening tools, such as screw drivers, can include magnetic sockets for receiving a fastener that is to be tightened by the fastening tools. That is, a fastening tool can magnetically hold a fastener therein that are easily removable so that the fastening tool can operate a plurality of fasteners in succession for threading the fasteners to respective nuts.

SUMMARY

In view of the state of the known technology, one aspect of the present disclosure is to provide a fastening tool comprising a gear train and a socket. The gear train rotates as the fastening tool moves between a non-operated position and an operated position. The socket receives a fastener at a first end of the fastener. The socket is rotatably supported to the gear assembly so that the socket rotates as the gear assembly rotates.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
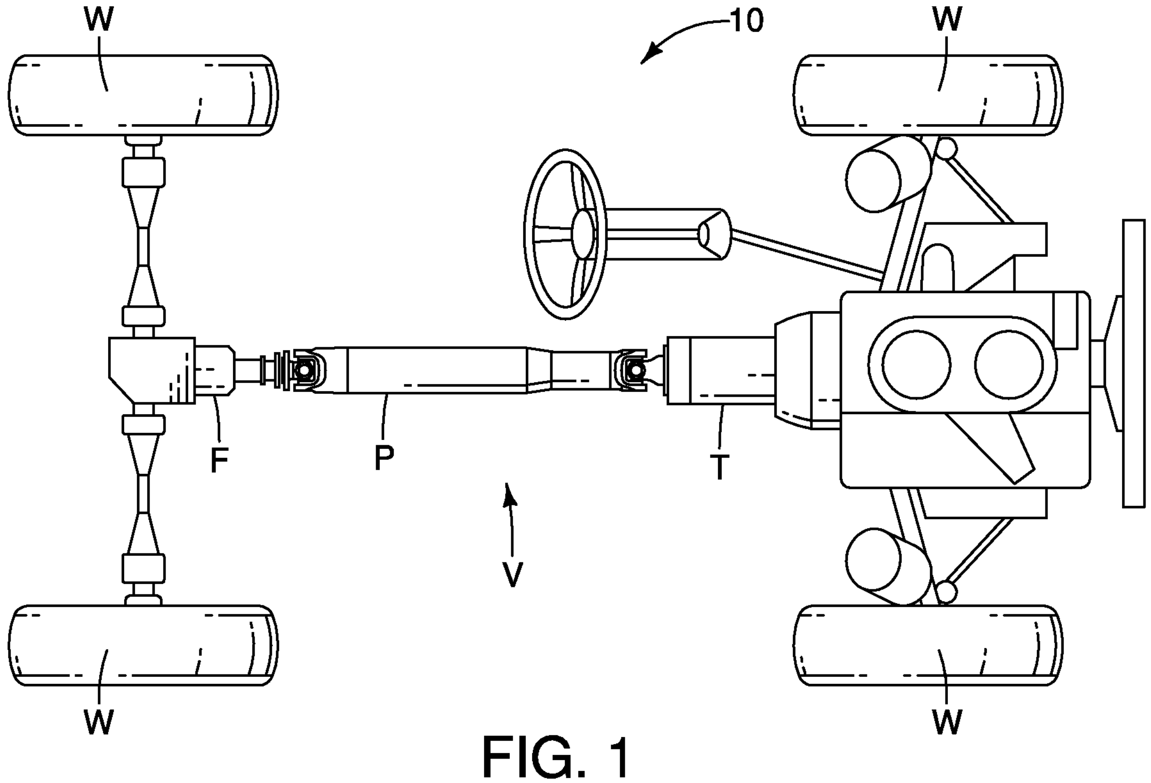
FIG. 1 is a schematic view of a conventional power train assembly.
Figure 2:
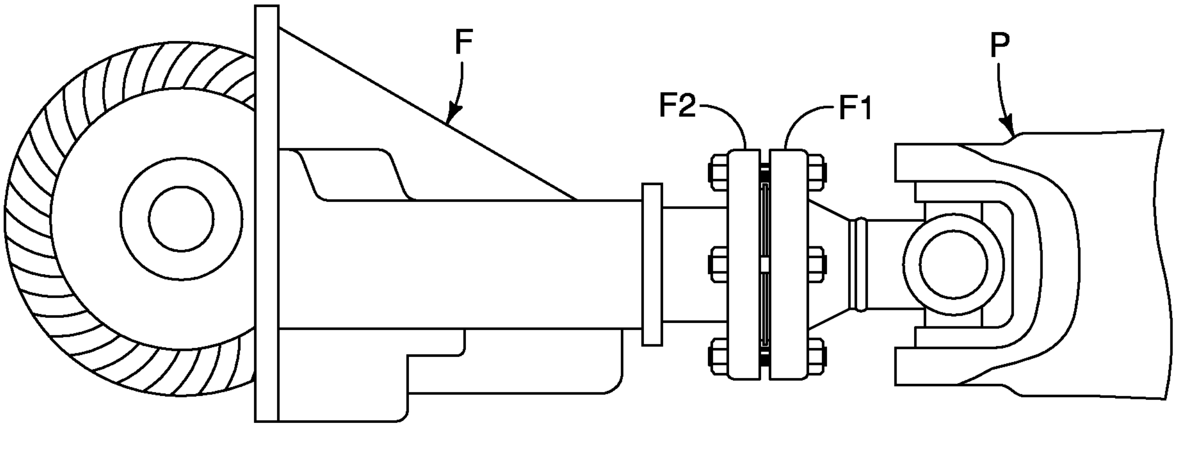
FIG. 2 is an enlarged view of vehicle components of the power train assembly of FIG. 1.

Referring initially to FIG. 1, a power train assembly 10 for a vehicle is illustrated in accordance with an embodiment. The power train assembly 10 comprises a group of vehicle components V that act to deliver power to the vehicle's driving wheels W. For example, the power train assembly can include a transmission T. The power train assembly 10 further includes a propeller shaft P and a final drive D, as shown in FIG. 2. In the illustrated embodiment, the propeller shaft P and the final dive 16 are considered examples of vehicle components V for transmitting mechanical power and torque and rotation. The vehicle components V illustrated are examples of conventional vehicle components that can be implemented with a conventional power train assembly.

Figure 3:
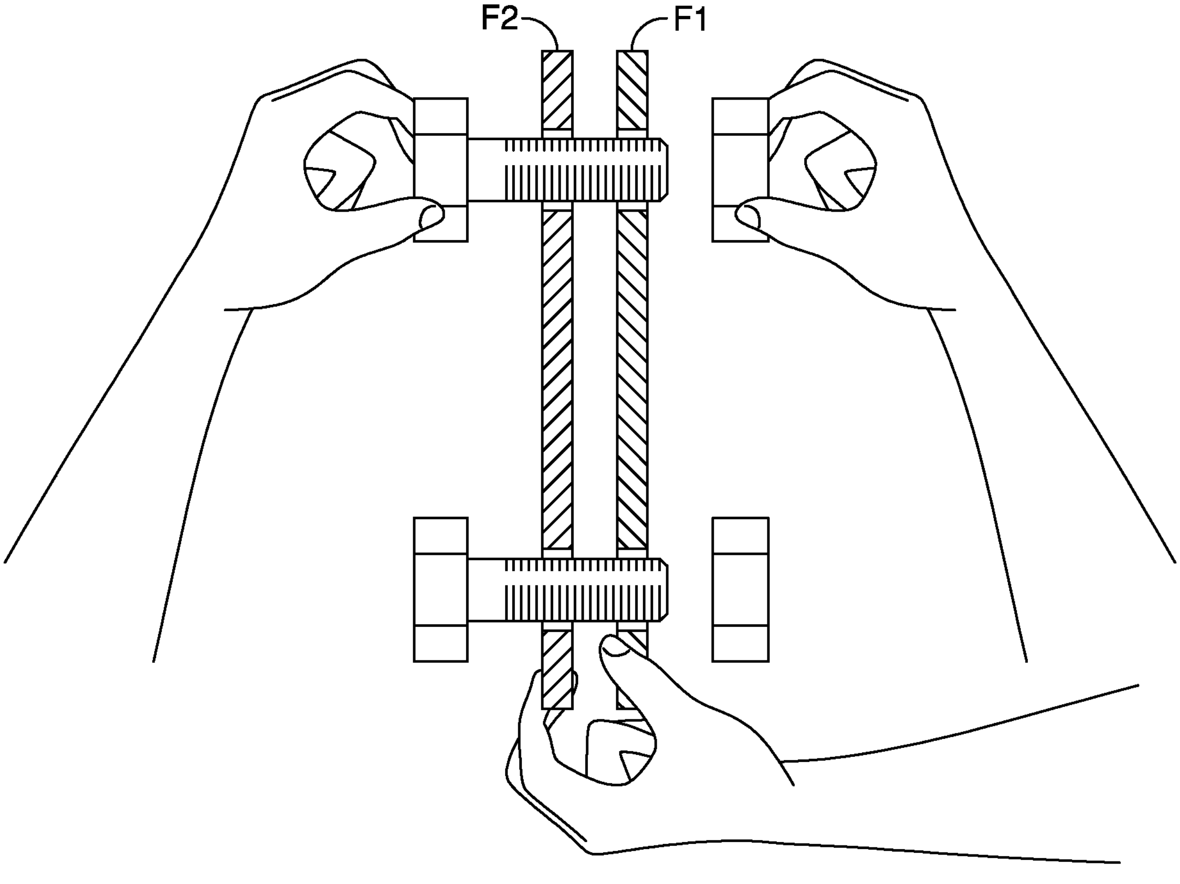
FIG. 3 is a simplified cross-sectional view of some of the vehicle components of the power train assembly of FIG. 1.
Figure 4:
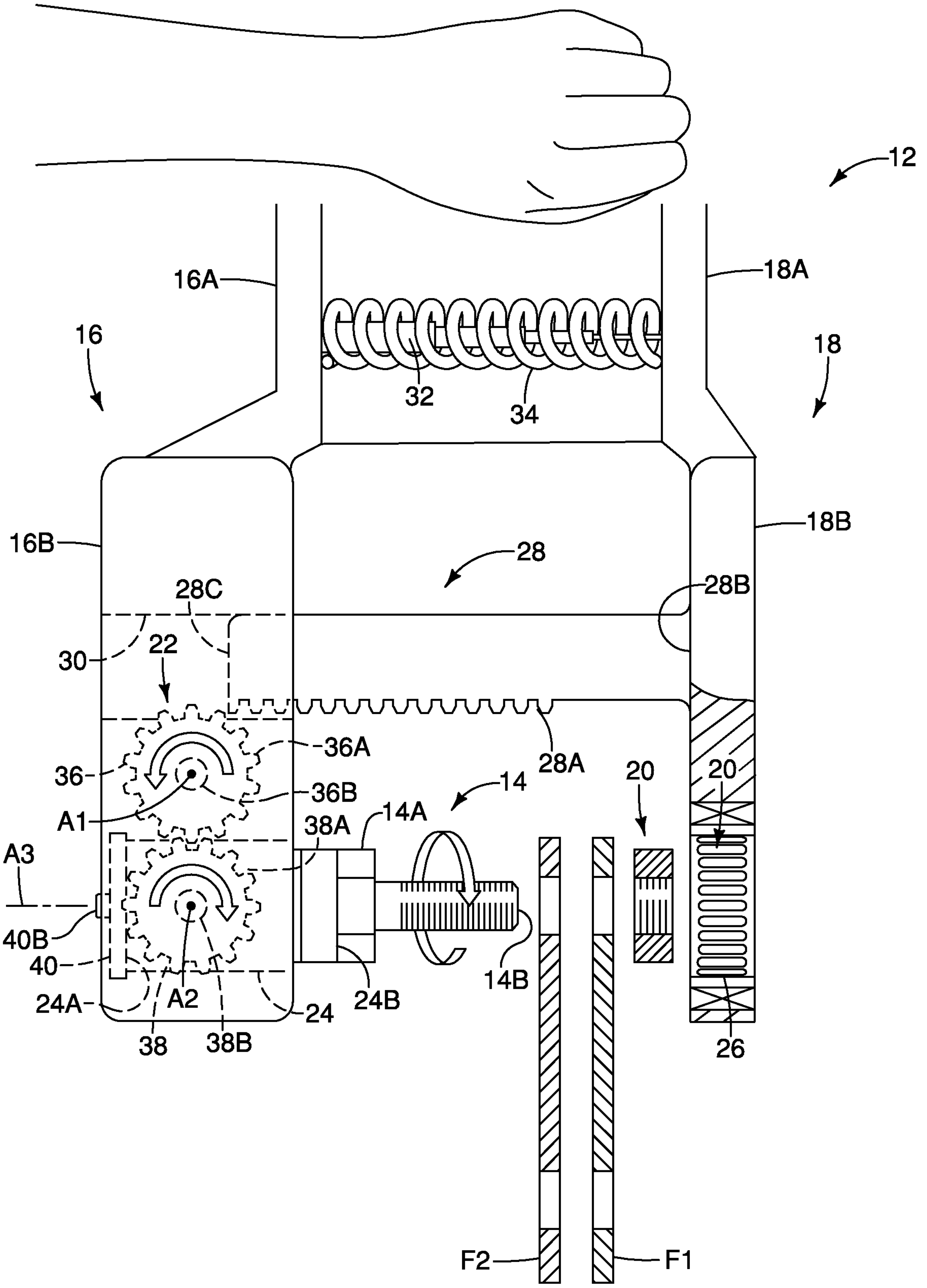
FIG. 4 is a plan view of a fastening tool for installing vehicle components of the power train assembly with the fastening tool in a non-operated position.
Figure 5:
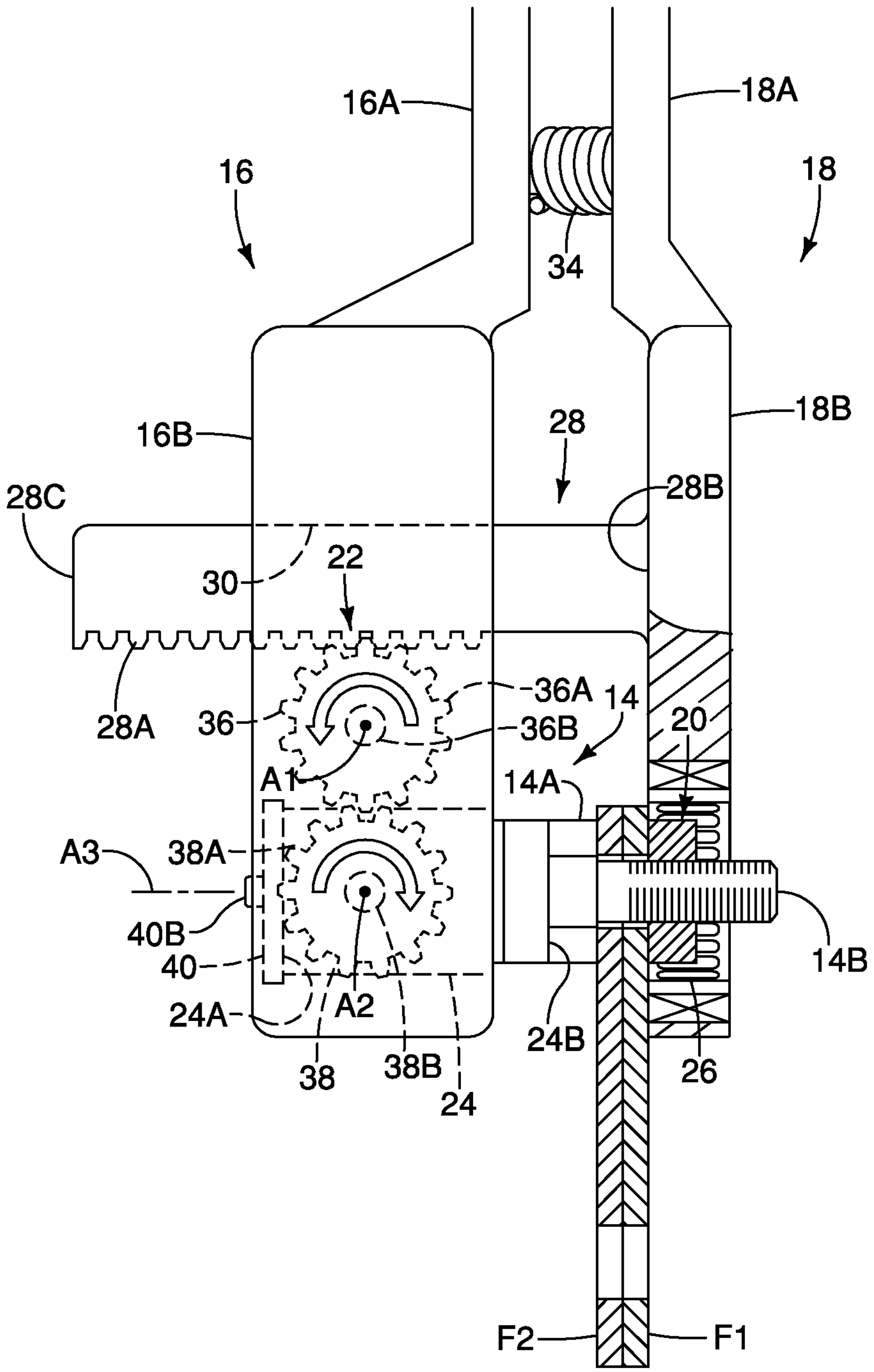
FIG. 5 is a plan view of the fastening tool of FIG. 4 with the fastening tool in an operated position.

As shown, the propeller shaft P and the final drive D are supported to each other to transfer torque from the transmission T to the drive wheels W. In particular, the propeller shaft P has a propeller shaft flange F1 (a first flange F1), as best seen in FIGS. 3 to 5. The final drive D has a final drive flange F2 (a second flange F2) that is configured to abut and contact the first flange F1. That is, the first flange F1 and the second flange F2 are supported to each other. In other words, the first flange F1 is attached to second flange F2 to support the propeller shaft P and the final drive D together.

Referring to FIG. 3, an example of installation of a conventional drive train assembly 10 is illustrated. That is, conventional installation of the propeller shaft P to the final drive D typically requires two to three people (or at least three hands) to install the two components together. In particular, at least one hand is needed to hold the first flange F1 and the second flange F2 together, while at least one other hand installs the fasteners 14 for fastening the first and second flanges 18 and 20. At least one more hand is required to install the nuts 20 that receive the fasteners 14 for securing the fasteners 14 to the first and second flanges 18 and 20.

Due to the weight of the vehicle components V of the drive train assembly 12, several installers are typically required in order to install these components together. Therefore, with a conventional drive train assembly 12, installation of the vehicle components V requires a great deal of time and is a difficult operation in order to carry out the installation process.

Therefore, a fastening tool 12 is provided in accordance with an illustrated embodiment. In particular, the fastening tool 12 is provided to install fasteners 14 to secure vehicle components V together. For example, the fastening tool 12 can install fasteners 14 that fastens the first and second flanges 18 and 20 together. However, it will be apparent to those skilled in the vehicle field from this disclosure that the fastening tool 12 can be used for installing all sorts of mechanical components together that are not illustrated herein. In the illustrated embodiment, the fastening tool 12 is provided to be used with threaded fasteners 14 and nuts 20 having threaded portions that can be mated.

Figure 6:
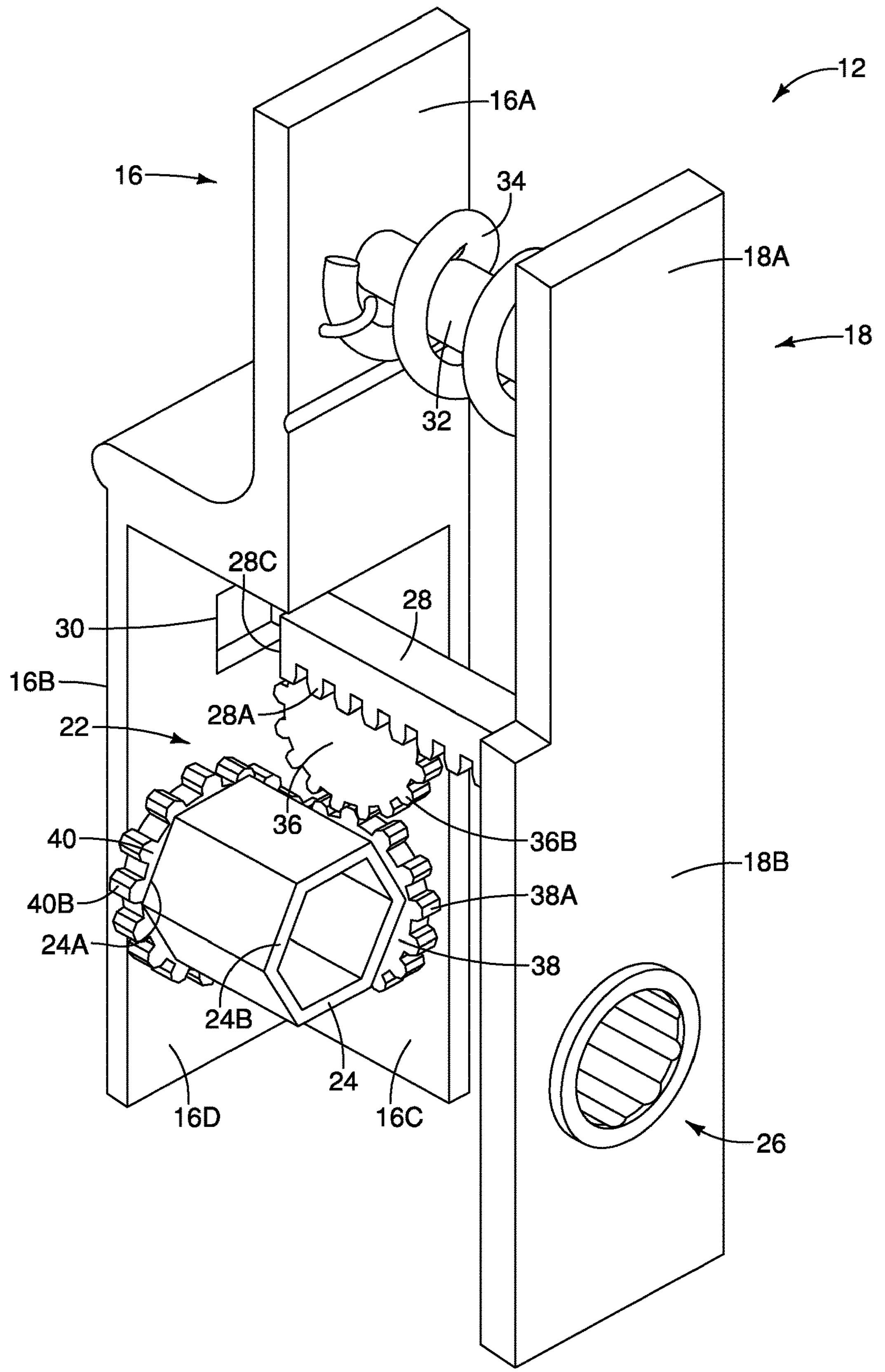
FIG. 6 is a top perspective view of the fastening tool.
Figure 8:
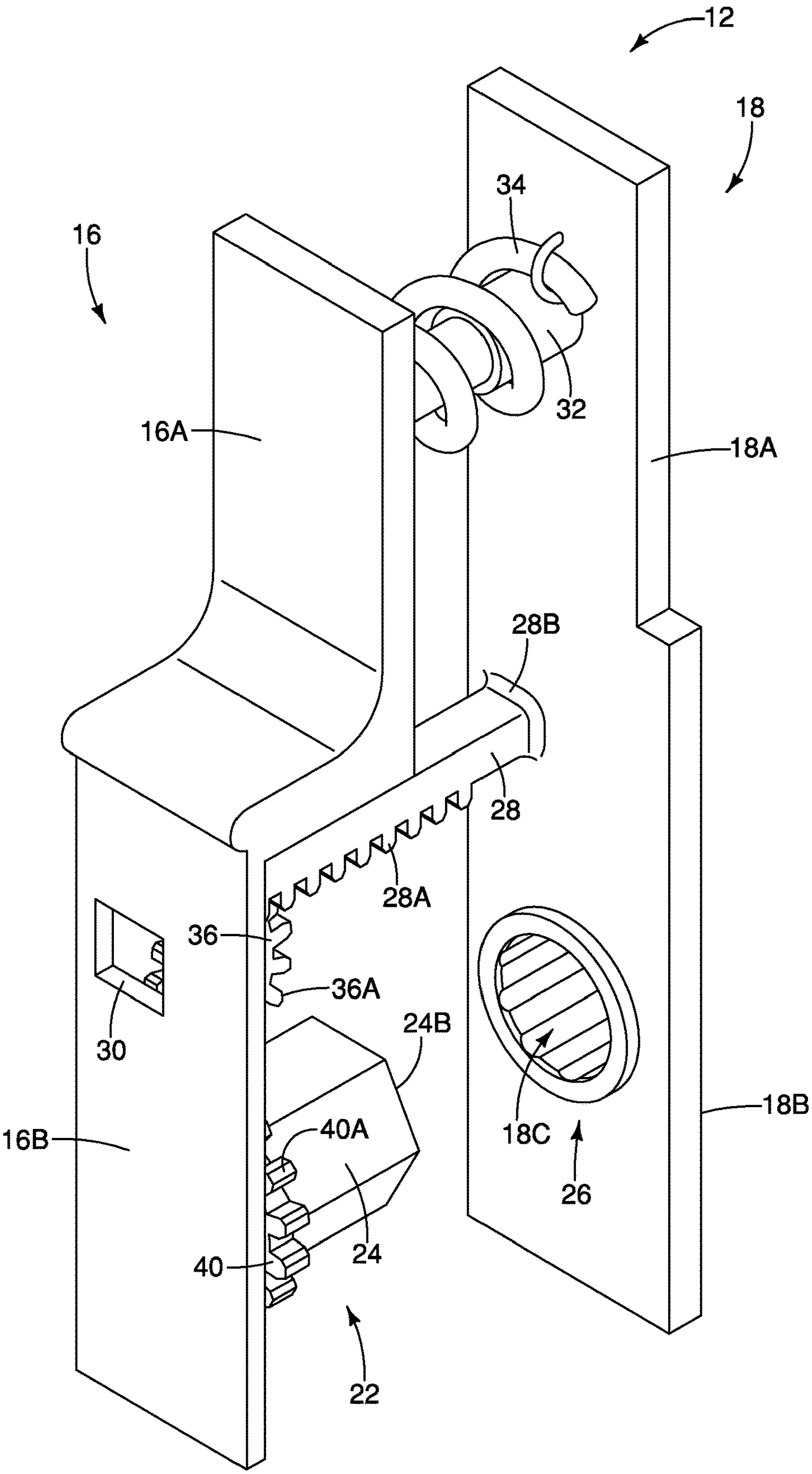
FIG. 8 is another top perspective view of the fastening tool in the non-operated position.
Figure 9:
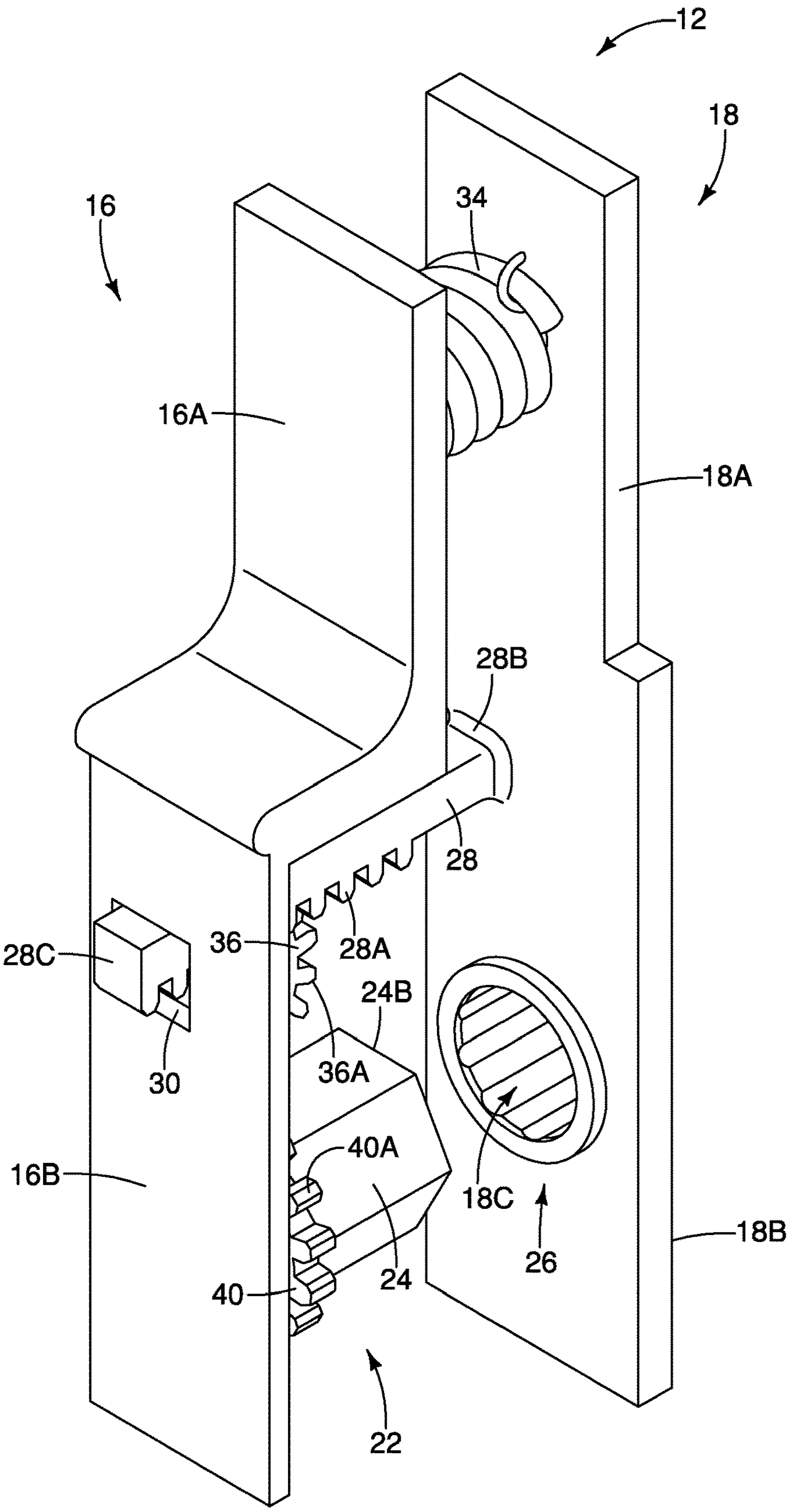
FIG. 9 is another top perspective view of the fastening tool in the operated position.

The fastening tool 12 of the illustrated embodiment is designed so that preferably only a single user for operating the fastening tool 12 is required. That is, implementation of the fastening tool 12 with the installation process of the vehicle components V should decrease the number of installers necessary. In particular, the fastening tool 12 is operated by a user so to move between a non-operated position and an operated position of the fastening tool 12. In the illustrated embodiment, the non-operated position is a rest position as shown in FIGS. 4, 6 and 8. The fastening tool 12 is compressed by the user into the operated position as shown in FIGS. 5 and 9. As shown, the fastening tool 12 includes a first holder 16 and a second holder 18 that are spaced from each other, as will be further discussed.

As shown in FIGS. 4 and 5, vehicle components V (e.g., the first and second flanges 18 and 20) can be provided between first and second holders 16 and 18 of the fastening tool 12 in order to install the fastener 14 through the vehicle components V. The fastener 14 is provided to the first holder 16 and the nut 20 is provided to the second holder 18. When the fastening tool 12 is compressed into the operated position, the fastening tool 12 pushes the fastener 14 through openings of the first and second flanges 18 and 20, while pressing the first and second flanges 18 and 20 together. As shown, the fastener 14 mates with the nut 20 when the fastening tool 12 is operated into the operated position.

Figure 7:
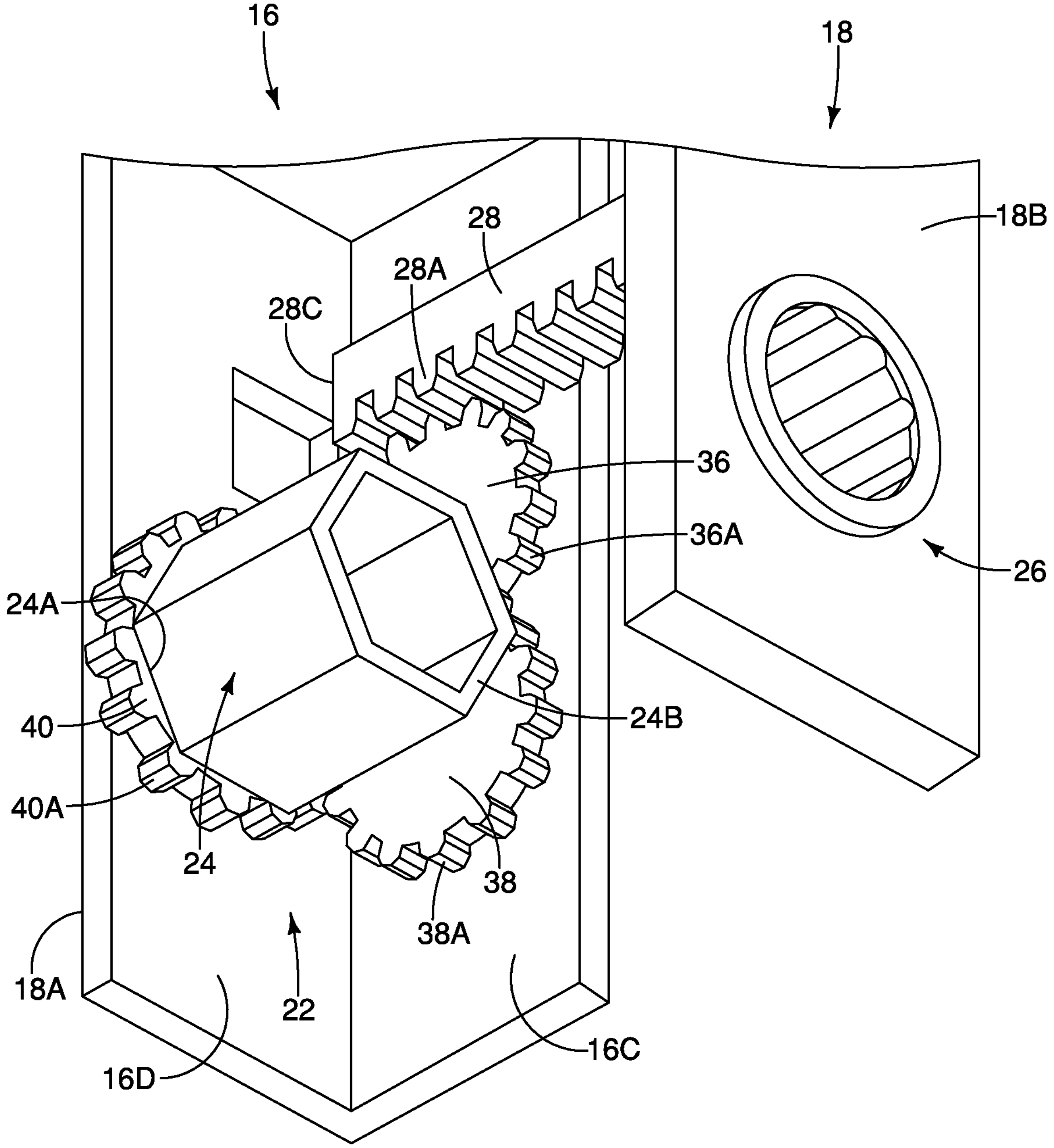
FIG. 7 is a bottom perspective view of a portion of the fastening tool.

In the illustrated embodiment, the fastening tool 12 comprises a gear train 22 and a socket 24. As best seen in FIGS. 6 and 7, the gear train 22 is supported to the first holder 16 and the socket 24 is supported to the gear train 22. The socket 24 receives the fastener 14 at a first end 14A (e.g., a head) of the fastener 14, as shown in FIGS. 4 and 5. The fastening tool 12 further comprises a one-way clutch 26 (i.e., a single rotation clutch). The one-way clutch 26 is supported to the second holder 18. The one-way clutch 26 receives the fastener 14 at a second end 14B (e.g., a threaded portion) of the fastener 14 as the fastening tool 12 moves from the non-operated position to the operated position. As shown, the fastening tool 12 further comprises a rack 28 having a plurality of teeth 28A. The teeth 28A of the rack 28 movably engage with the gear train 22 as the fastening tool 12 moves between the non-operated position and the operated position, as will be further discussed below.

As shown in FIGS. 4 and 5, the first and second holders 16 and 18 move towards each other as the fastening tool 12 moves from the non-operated position to the operated position. The first holder 16 has a first handle portion 16A. The second holder 18 has a second handle portion 18A. The first and second handle portions 16A and 18A together define a user operating portion or a gripping portion of the fastening tool 12. The first and second handle portions 16A and 18A are squeezed together by the user to operate the fastening tool 12.

Referring to FIGS. 5 to 7, the first holder 16 has a first main body portion 16B that supports the gear train 22. The first main body portion 16B extends from the first handle portion 16A. In particular, the first holder 16 can be a one-piece member made of metal, such as aluminum or silver, having both the first handle portion 16A and the first main body portion 16B that are integrally formed together. That is, the first handle portion 16A and the first main body portion 16B can be a single piece of metal that supports the gear train 22. Alternatively, the first handle portion 16A and the first main body portion 16B can be separate plates of metal that are joined together, such as by welding.

As best seen in FIGS. 6 and 7, the first main body portion 16B includes at least a first support 16C and a second support 16D. The first and second supports 16C and 16D are preferably metallic plates that extend cantilevered with respect to each other. The gear train 22 is supported to the first and second supports 16C and 16D, as will be further discussed below. It will be apparent to those skilled in the vehicle field from this disclosure that the configuration of the components of the first holder 16 and can be modified in order to support the gear train 22 as necessary.

The second holder 18 has a second main body portion 18B that supports the one-way clutch 26. The second main body portion 18B extends from the second handle portion 18A. In particular, the second holder 18 can be a one-piece member made of metal, such as aluminum or silver, having both the second handle portion 18A and the second main body portion 18B that are integrally formed together. That is, the second handle portion 18A and the second main body portion 18B can be a single plate of metal that supports the gear train 22. Alternatively, the second handle portion 18A and the second main body portion 18B can be separate plates of metal that are joined together, such as by welding.

The second main body portion 18B at least includes a plate having an opening 18C that supports the nut 20 therein. It will be apparent to those skilled in the vehicle field from this disclosure that the configuration of the components of the second holder 18 and can be modified in order to support the gear train 22 as necessary.

As seen in FIG. 4, the first and second main body portions 16B and 18B are preferably separated by a first space S1 that is greater than a second space S2 that separates the first and second handle portions 16A and 18A. As shown, the first holder 16 has a through hole 30 for receiving the rack 28 as the fastening tool 12 is operated into the operated position. The through hole 30 is located adjacent to the gear train 22 so that the rack 28 engages the gear train 22 as the rack 28 moves through the through hole 30 of the first holder 16. Therefore, one of the first and second holders 16 and 18 has the through hole 30 that receives the rack 28 therethrough as the fastening tool 12 moves from the non-operated position to the operated position.

The rack 28 is a rigid, elongated piece that is preferably made of metal. The rack 28 extends from one of the first and second holders 16 and 18 to the other one of the first and second holders 16 and 18. In particular, the rack 28 is fixed to the second holder 18 at a first end 28B of the rack 28. The rack 28 can be fixed to the second holder 18 by conventional means, such as by welding. The rack 28 includes a second end 28C that is a free end that moves through the through hole 30 of the first holder 16. Therefore, the rack 28 moves from the second holder 18 through the through hole 30 of the first holder 16 when the first and second handle portions 16A and 18A are compressed. It will be apparent to those skilled in the vehicle field from this disclosure that the rack 28 can be modified to extend from the first holder 16 towards the second holder 18 so to move through a through hole of the second holder 18.

The fastening tool 12 further comprises a telescopic pole 32 that support the first and second holders 16 and 18 to each other. That is, the telescopic pole 32 connects the first and second handle portions 16A and 18A. The telescopic pole 32 compresses as the fastening tool 12 moves from the non-operated position to the operated position. The telescopic pole 32 is expandable back to the non-operated position once the user releases the first and second handle portions 16A and 18A.

The fastening tool 12 further comprise a compression spring 34. The compression spring 34 is operatively coupled to the first and second holders 16 and 18 to bias the first and second holders 16 and 18 towards the non-operated position (e.g., outward or to the non-compressed state). The compression spring 34 is preferably wound around the telescopic pole 32 to bias the telescopic pole 32 towards the expanded position so that the telescopic pole 32 pushes the first and second holders 16 and 18 into the non-operated position. The compression spring 34 can alternatively be operatively coupled to the ends of the telescopic pole 32 to bias the telescopic pole 32 into the expanded position. The fastening tool 12 is biased back towards the non-operated position by the compression spring 34 once the user releases his/her grip on the first and second handle portions 16A and 18A.

Referring to FIGS. 4 to 7, the gear train 22 rotates as the fastening tool 12 moves between the non-operated position and the operated position. As best seen in FIGS. 6 and 7, the gear train 22 includes a first gear 36 having a plurality of first teeth 36A that operatively engage the teeth 28A of the rack 28. The first gear 36 includes a first axle 36B that defines a first center rotational axis A1 of the first gear 36. The first axle 36B is supported to the first support 16C of the first main body portion 16B such that the first gear 36 is supported to the first support 16C. The first gear 36 rotates about the first center rotational axis A1.

The gear train 22 further includes a second gear 38 having a plurality of second teeth 38A that that operatively engage the first teeth 36A of the first gear 36. The second gear 38 includes a second axle 38B that defines a second center rotational axis A2 of the second gear 38. The second axle 38B is supported to the first support 16C of the first main body portion 16B such that the second gear 38 is supported to the first support 16C. The second gear 38 rotates about the second center rotational axis A2.

The gear train 22 further includes a third gear 40 having a plurality of third teeth 40A that operatively engage the second teeth 38A of the second gear 38. The third gear 40 includes a third axle 40B that defines a third center rotational axis A3 of the third gear 40. The third axle 40B is supported to the second support 16D of the first main body portion 16B such that the third gear 40 is supported to the second support 16D. The third gear 40 rotates about the third center rotational axis A3. The first, second and third gears 36, 38 and 40 together form a planetary gear set of the fastening tool 12.

As best seen in FIGS. 4 to 7, the socket 24 is rotatably supported to the gear assembly so that the socket 24 rotates as the gear train 22 rotates. As shown, the socket 24 is supported to the third gear 40 by conventional means, such as by welding. Therefore, the socket 24 is made of metal, preferably made of ferromagnetic metals such as nickel and iron. The socket 24 includes a first end 24A that is supported to the third gear 40. That is, the first end 24A of the socket 24 can be welded to the third gear 40. The socket 24 has a second end 24B that is an open end that receives the fastener 14 therein. Preferably, the socket 24 is a magnetic socket 24 that magnetically holds the fastener 14 therein. The second end 24B is sized and dimensioned to receive the first end 14A (the head) of the fastener 14. That is, the second end 24B is preferably has a size and shape that substantially corresponds to the head 14A of the fastener 14 so that the fastener 14 is fitted to the second end 24B of the socket 24. The fastener 14 is removably supported to the socket 24 by magnetic force.

As seen in FIGS. 8 to 12, the second holder 18 has the one-way clutch 26 that is built into the metal plate of the second holder 18. As seen in FIGS. 6 to 8, the one-way clutch 26 has the opening 18C facing the socket 24. As best seen in FIG. 4, the nut 20 is fitted into the opening 18C of the one-way clutch 26 and is held in place (stationary) as the fastening tool 12 is being operated to the operated position. The opening 18C of the one-way clutch 26 receives the fastener 14 at the second end 14B (e.g., the threaded portion) of the fastener 14 as the fastening tool 12 moves from the non-operated position to the operated position. In particular, the fastener 14 is screwed into the nut 20 that is held in place by the one-way clutch 26. When the fastening tool 12 is biased back towards the non-operated, the one-way clutch 26 rotates to release the nut 20.

Figure 10:
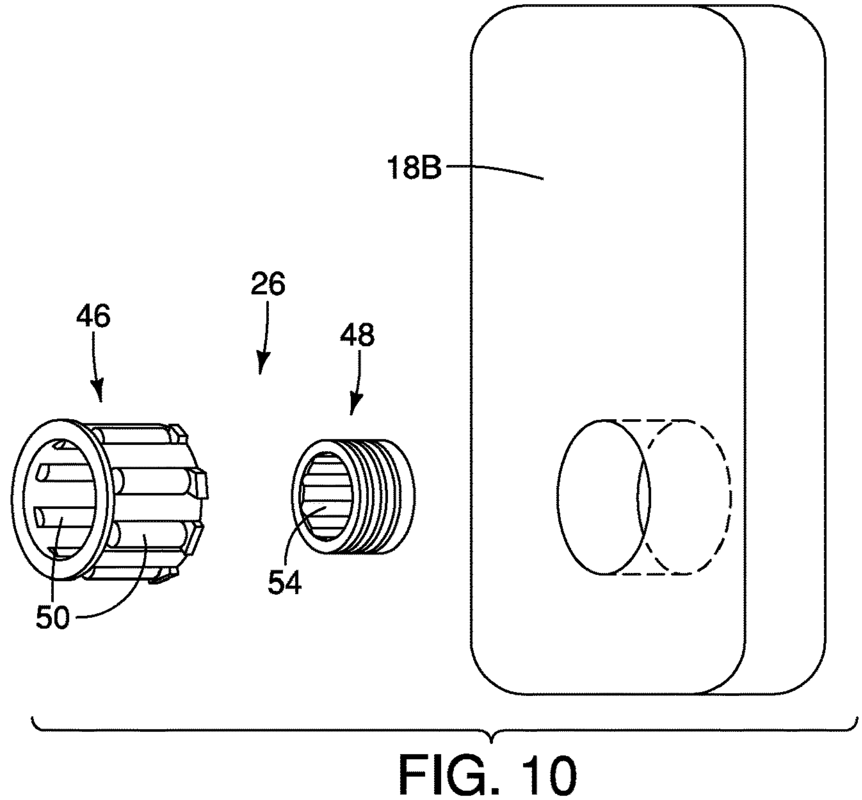
FIG. 10 is a perspective view of a portion of the fastening tool showing a one-way clutch in exploded view.
Figure 11:
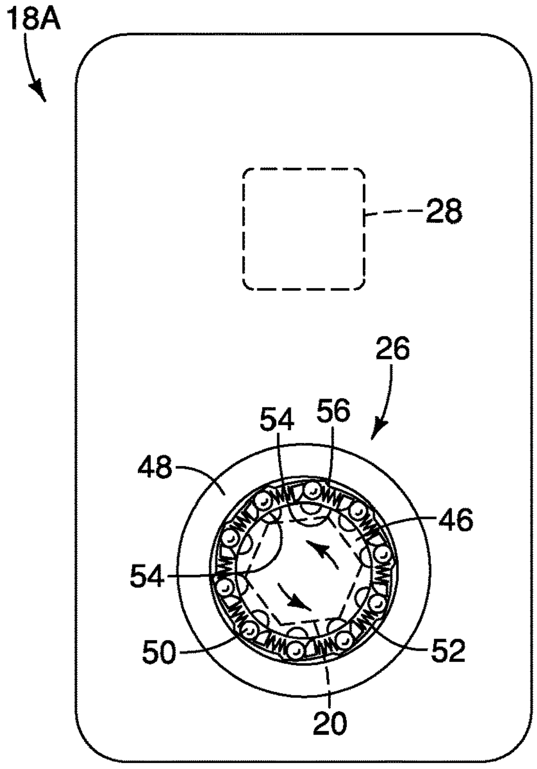
FIG. 11 is a plan view of the portion of the fastening tool of FIG. 10 showing the one-way clutch in a freewheeling state.
Figure 12:
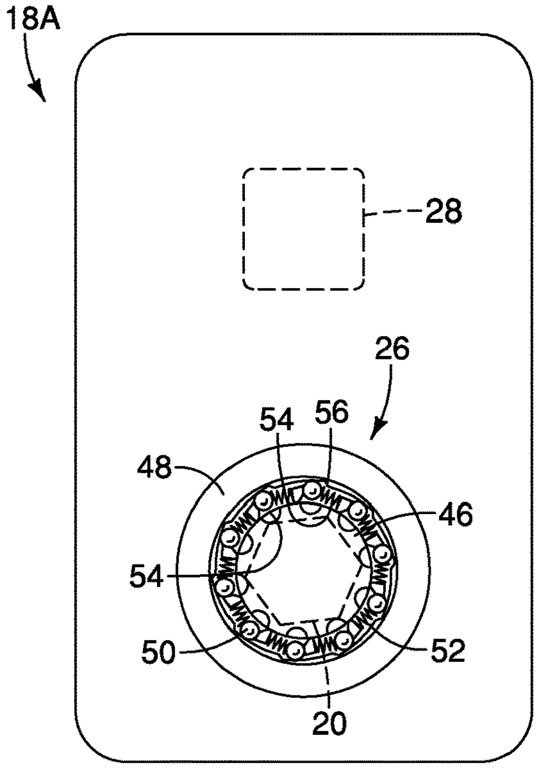
FIG. 12 is a plan view of the portion of the fastening tool of FIGS. 10 and 11 showing the one-way clutch in a locked state.

As best seen in FIGS. 10 to 12, the one-way clutch 26 includes an outer race 46, an inner race 48 and a plurality of rollers 50. The inner race 48 has a plurality of rollers 50 and the outer race 46 includes a plurality of recesses 54. Specifically, the rollers 50 engages the wedges 56 as the one-way clutch 26 moves between a freewheeling state and a locked state. In the locked state, the rollers 50 of the one-way clutch 26 are disposed in the wedges 56 between the recesses 54 to lock the inner and outer races 46 and 48 together as seen in FIG. 12. In the freewheeling state, the rollers 50 are configured to contact the recesses 54, as seen in FIG. 11 to enable freewheeling.

As stated, the nut 20 is fitted into the inner race 48, as seen in FIGS. 11 and 12. Preferably, the nut 20 is fitted into the recesses 54 of the inner race 48. In the illustrated embodiment, when the inner race 48 is rotated in a first direction (e.g., the clockwise direction as shown in FIG. 11), the rollers 50 are disposed in the narrow edge of the wedges 56 between the recesses 54. Therefore, the inner and outer races 46 and 48 are engaged or locked when the inner race 48 is rotated in the first direction (i.e., when the fastener 14 is being tightened to the nut 20). When the user releases the first and second handle portions 16A and 18A, the fastening tool 12 is biased back into the non-operated position by the compression spring 34. The rack 28 engages with the gear train 22 so that the gear train 22 rotates in the opposite direction from the direction that the gear train 22 rotated when the fastening tool 12 was being moved to the operated position. As a result, the inner race 48 is rotated in a second direction (e.g., the counter-clockwise direction) so that the rollers 50 are disposed in the recesses 54 to enable freewheeling with the inner and outer races 46 and 48 in order to release the nut 20 without unthreading the nut from the fastener 14.

Figure 13:
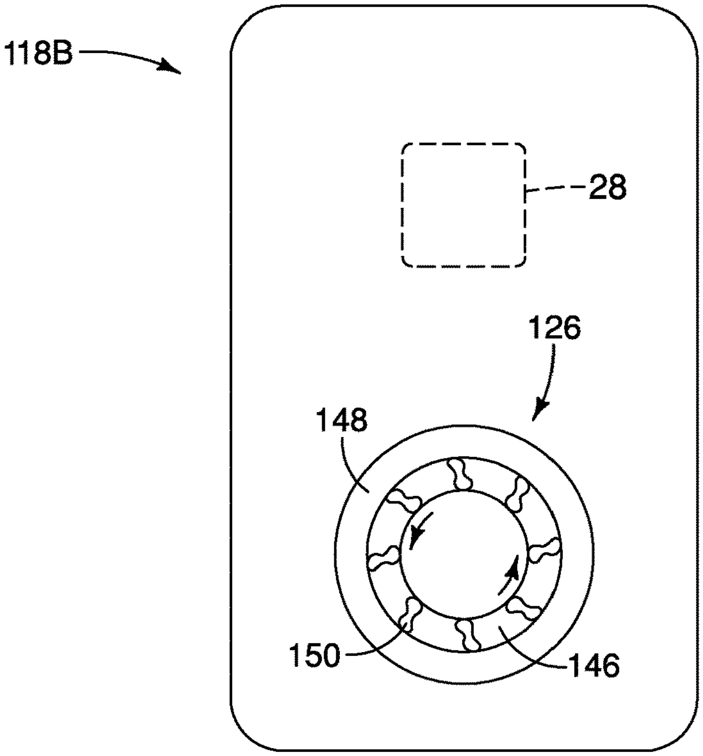
FIG. 13 is a plan view of a modified portion of the fastening tool having a one-way clutch in a freewheeling state.
Figure 14:
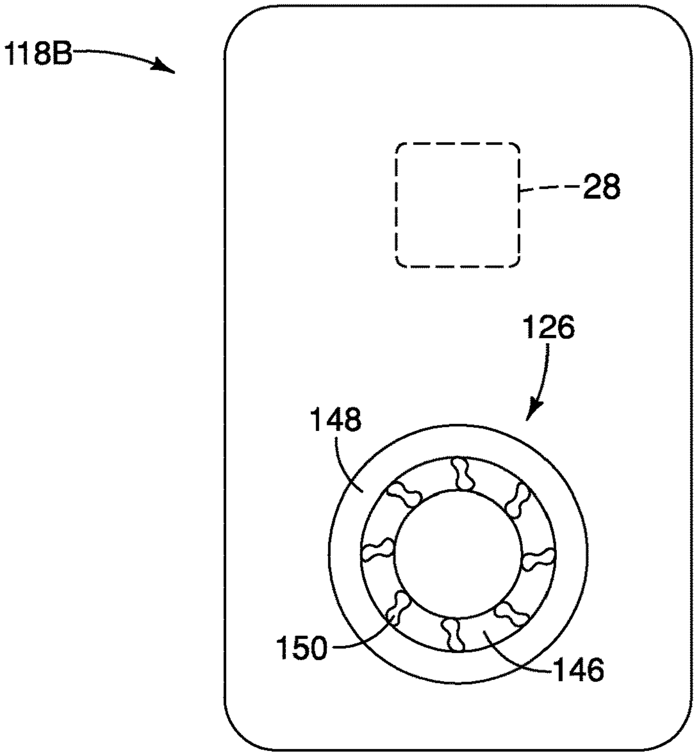
FIG. 14 is a plan view of the modified portion of the fastening tool of FIG. 13 having the one-way clutch in a locked state.

In the illustrated embodiment, the one-way clutch 26 is illustrated as a roller clutch. However, it will be apparent to those skilled in the vehicle field from this disclosure that the one-way clutch 26 can alternatively be other types of single rotational clutches, such as a sprag clutch as illustrated in FIGS. 13 and 14. It will also be apparent to those skilled in the vehicle field from this disclosure that the one-way clutch 26 can alternatively be a ratchet clutch or other types of single rotational clutch.

Referring to FIGS. 13 and 14, a modified second main body portion 118B of the second holder 18 that can be implemented with the fastening tool 12 is illustrated. That is, the second main body portion 18B of the second holder 18 can be replaced with the modified second main body portion 118B of FIGS. 13 and 14. The modified second main body portion 118B includes a modified one-way clutch that is a sprag clutch 126. The sprag clutch includes an inner race 146 and an outer race 148.

The sprag clutch 126 operates similarly to the roller clutch 26. However, instead of cylindrical rollers 50, the sprag clutch 126 includes a plurality of non-revolving asymmetric figure-eight shaped sprags 150, or other elements allowing single direction rotation. When the sprag clutch 126 rotates in one direction (e.g., the counterclockwise direction) the sprags 150 slip or freewheel. When a torque is applied in the opposite direction (e.g., the clockwise direction), the sprags 150 tilt slightly, producing a wedging action and binding the inner and outer races 146 and 148 with friction. The sprags 150 are spring-loaded on their pivots to ensure that they lock with very little backlash once drive is engaged.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fastening tool comprising:

a gear train that rotates as the fastening tool moves between a non-operated position and an operated position;

a socket for receiving a fastener at a first end of the fastener, the socket being rotatably supported to the gear assembly so that the socket rotates as the gear assembly rotates;

a one-way clutch having an opening facing the socket so that the opening of the one-way clutch receives the fastener at a second end of the fastener as the fastening tool moves from the non-operated position to the operated position;

a first holder, the gear train being supported to the first holder; and a second holder that is supported to and is spaced from the first holder, the one-way clutch being supported to the second holder, the first and second holders being biased against each other when the fastening tool is in the non-operated position, the first and second holders moving towards each other as the fastening tool moves from the non-operated position to the operated position.

2. The fastening tool according to claim 1, further comprising a rack having a plurality of teeth that movably engage with the gear train as the fastening tool moves between the non-operated position and the operated position.

3. The fastening tool according to claim 2, wherein the rack extends from one of the first and second holders to the other one of the first and second holders.

4. The fastening tool according to claim 3, wherein one of the first and second holders having a through hole that receives the rack therethrough as the fastening tool moves from the non-operated position to the operated position.

5. The fastening tool according to claim 1, further comprising a telescopic pole supporting the first and second holders to each other.

6. The fastening tool according to claim 5, wherein the telescopic pole compresses as the fastening tool moves from the non-operated position to the operated position.

7. The fastening tool according to claim 6, further comprising a compression spring operatively coupled to the first and second holders to bias the first and second holders towards the non-operated position.

8. The fastening tool according to claim 7, wherein the compression spring is wound around the telescopic pole.

9. The fastening tool according to claim 6, wherein the first holder has a first handle portion, the second holder has a second handle portion, the telescopic pole connecting the first and second handle portions.

10. The fastening tool according to claim 9, wherein the first holder has a first main body portion that supports the gear train, the second holder has a second main body portion that supports the one-way clutch, the first and second main body portions being separated by a first space that is greater than a second space that separates the first and second handle portions.

11. The fastening tool according to claim 1, wherein the gear train includes a first gear having a plurality of first teeth that operatively engage the teeth of the rack.

12. The fastening tool according to claim 11, wherein the gear train further includes a second gear having a plurality of second teeth that that operatively engage the first teeth.

13. The fastening tool according to claim 12, wherein the gear train further includes a third gear having a plurality of third teeth that operatively engage the second teeth.

14. The fastening tool according to claim 13, wherein the socket is supported to the third gear.

15. The fastening tool according to claim 1, wherein the socket is a magnetic socket.

16. The fastening tool according to claim 1, wherein the one-way clutch is configured to hold a nut that is screwed to the fastener as the fastening tool moves from the non-operated position to the operated position.

* * * * *